(12) United States Patent
Yang et al.

(10) Patent No.: US 12,210,837 B2
(45) Date of Patent: Jan. 28, 2025

(54) SYSTEMS AND METHODS FOR MACHINE-LEARNED PREDICTION OF SEMANTIC SIMILARITY BETWEEN DOCUMENTS

(71) Applicant: Google LLC, Mountain View, CA (US)

(72) Inventors: Liu Yang, Sunnyvale, CA (US); Marc Najork, Palo Alto, CA (US); Michael Bendersky, Cupertino, CA (US); Mingyang Zhang, San Jose, CA (US); Cheng Li, Mountain View, CA (US)

(73) Assignee: GOOGLE LLC, Mountain View, CA (US)

( * ) Notice: Subject to any disclaimer, the term of this patent is extended or adjusted under 35 U.S.C. 154(b) by 59 days.

(21) Appl. No.: 18/321,424

(22) Filed: May 22, 2023

(65) Prior Publication Data

US 2023/0297783 A1 Sep. 21, 2023

Related U.S. Application Data

(63) Continuation of application No. 17/078,569, filed on Oct. 23, 2020, now Pat. No. 11,694,034.

(51) Int. Cl.
*G06F 40/30* (2020.01)
*G06F 40/205* (2020.01)
(Continued)

(52) U.S. Cl.
CPC ............ *G06F 40/30* (2020.01); *G06F 40/205* (2020.01); *G06N 3/045* (2023.01); *G06N 3/08* (2013.01)

(58) Field of Classification Search
CPC ....... G06F 40/30; G06F 40/205; G06N 3/045; G06N 3/08
See application file for complete search history.

(56) References Cited

U.S. PATENT DOCUMENTS 11,146,613 B2 10/2021 Felderman et al.
11,238,521 B2 * 2/2022 Malkiel .................. G06N 20/00
11,308,320 B2 * 4/2022 Lee ...................... G06V 30/413

OTHER PUBLICATIONS

Jiang, Jyun-Yu, Mingyang Zhang, Cheng Li, Michael Bendersky, Nadav Golbandi, and Marc Najork, "Semantic Text Matching for Long-Form Documents", May 2019, Proceedings of the 2019 World Wide Web Conference (WWW '19), pp. 795-806. (Year: 2019).*

(Continued)

*Primary Examiner* — Daniel C Washburn
*Assistant Examiner* — James Boggs
(74) *Attorney, Agent, or Firm* — DORITY & MANNING P.A.

(57) ABSTRACT

Systems and methods of the present disclosure are directed to a method for predicting semantic similarity between documents. The method can include obtaining a first document and a second document. The method can include parsing the first document into a plurality of first textual blocks and the second document into a plurality of second textual blocks. The method can include processing each of the plurality of first textual blocks and the second textual blocks with a machine-learned semantic document encoding model to obtain a first document encoding and a second document encoding. The method can include determining a similarity metric descriptive of a semantic similarity between the first document and the second document based on the first document encoding and the second document encoding.

20 Claims, 8 Drawing Sheets

(51) Int. Cl.
  *G06N 3/045* (2023.01)
  *G06N 3/08* (2023.01)

(56) References Cited

OTHER PUBLICATIONS

Zhang, Xingxing, Furu Wei, and M. Zhou, "HIBERT: Document Level Pre-training of Hierarchical Bidirectional Transformers for Document Summarization", Jul. 2019, Proceedings of the 57th Annual Meeting of the Association for Computational Linguistics, pp. 5059-5069. (Year: 2019).*

Ostendorff, Malte, Terry Ruas, Till Blume, Bela Gipp, and Georg Rehm, "Aspect-based Document Similarity for Research Papers", Oct. 13, 2020, arXiv preprint arXiv:2010.06395. (Year: 2020).*

Huang, Tongwen, Qingyun She, and Junlin Zhang, "BoostingBERT: Integrating Multi-Class Boosting into BERT for NLP Tasks", Sep. 13, 2020, arXiv preprint arXiv:2009.05959. (Year: 2020).*

Ostendorff, Malte, Terry Ruas, Moritz Schubotz, Georg Rehm, and Bela Gipp, "Pairwise Multi-Class Document Classification for Semantic Relations between Wikipedia Articles", Aug. 2020, Proceedings of the ACM/IEEE Joint Conference on Digital Libraries in 2020 (JCDL '20), pp. 127-136. (Year: 2020).*

Reimers, Nils, and Iryna Gurevych, "Sentence-BERT: Sentence Embeddings using Siamese BERT-Networks", Nov. 2019, Proceedings of the 2019 Conference on Empirical Methods in Natural Language Processing and the 9th International Joint Conference on Natural Language Processing, pp. 3982-3992. (Year: 2019).*

Devlin, Jacob, Ming-Wei Chang, Kenton Lee, and Kristina Toutanova, "BERT: Pre-training of Deep Bidirectional Transformers for Language Understanding", Jun. 2019, Proceedings of NAACL-HLT 2019, vol. 1, pp. 4171-4186. (Year: 2019).*

Huang et al., "Embedding-based Retrieval in Facebook Search.", Proceedings of the Twenty-sixth ACM SIGKDD Conference on Knowledge Discovery and Data Mining, 2020, pp. 2553-2561.

Jiang et al., "Semantic Text Matching for Long-Form Documents", 2019 World Wide Web Conference, San Francisco, California, May 13-17, 2019, pp. 795-806.

Lu et al., "Twin BERT: Distilling Knowledge to Twin-Structured BERT Models for Efficient Retrieval", arXiv:2002.06275v1, Feb. 14, 2020, 8 pages.

Peters et al., "Deep Contextualized Word Representations.", 2018, Proceedings of NAACL-HLT 2018, pp. 2227-2237, (Year: 2018).

Yang et al., "Beyond 512 Tokens: Siamese Multi-depth V Transformer-based Hierarchical Encoder for Long-Form Document Matching.", 2020, Proceedings of the Twenty-ninth ACM International Conference on Information & Knowledge Management, 2020, pp. 1725-1734.

Zhang et al., "HIBERT: Document Level Pre-training of Hierarchical Bidirectional Transformers for Document Summarization.", Fifty-seventh Annual Meeting of the Association for Computational Linguistics, Florence, Italy, Jul. 28-Aug. 2, 2019, pp. 5059-5069.

* cited by examiner

SYSTEMS AND METHODS FOR MACHINE-LEARNED PREDICTION OF SEMANTIC SIMILARITY BETWEEN DOCUMENTS

PRIORITY CLAIM

The present application is a continuation of U.S. application Ser. No. 17/078,569 having a filing date of Oct. 23, 2020, now issued U.S. Pat. No. 11,684,034. Applicant claims priority to and the benefit of each of such applications and incorporate all such applications herein by reference in its entirety.

FIELD

The present disclosure relates generally to predicting a semantic similarity between documents. More particularly, the present disclosure relates to training and utilization of a machine-learned semantic document encoding model.

BACKGROUND

Many natural language processing and information retrieval problems can be formalized as a semantic matching task. However, unlike matching between "short" textual segments (e.g., one or two sentences), semantic matching between long documents (e.g., articles, books, websites, blogs, etc.) presents a number of difficult challenges. As an example, semantic understanding of documents requires the modeling of long-distance dependencies between each textual unit (e.g., sentences), leading to computational costs that grow quadratically with the length of a document (e.g., attention computation in a transformer network, etc.). As another example, documents generally contain complex internal structures (e.g., passages, sentences, blurbs, captions, etc.), which conventional semantic analysis models fail to understand. As such, a model that can perform efficient semantic matching between long documents represents a significant advancement in natural language processing.

SUMMARY

Aspects and advantages of embodiments of the present disclosure will be set forth in part in the following description, or can be learned from the description, or can be learned through practice of the embodiments.

One example aspect of the present disclosure is directed to a computer-implemented method for predicting semantic similarity between documents. The method can include obtaining, by a computing system comprising one or more computing devices, a first document comprising a plurality of first sentences and a second document comprising a plurality of second sentences. The method can include parsing, by the computing system, the first document into a plurality of first textual blocks and the second document into a plurality of second textual blocks, wherein each of the plurality of first textual blocks comprises one or more of the plurality of first sentences and each of the plurality of second textual blocks comprises one or more of the plurality of second sentences. The method can include processing, by the computing system, each of the plurality of first textual blocks with a block encoding portion of a first encoding submodel of a machine-learned semantic document encoding model to obtain a respective plurality of first textual block representations. The method can include processing, by the computing system, each of the plurality of second textual blocks with a block encoding portion of a second encoding submodel of the machine-learned semantic document encoding model to obtain a respective plurality of second textual block representations. The method can include respectively processing, by the computing system, the plurality of first textual block representations and the plurality of second textual block representations with a document encoding portion of the first encoding submodel and a document encoding portion of the second encoding submodel to obtain a first document encoding and a second document encoding. The method can include determining, by the computing system, a similarity metric descriptive of a semantic similarity between the first document and the second document based on the first document encoding and the second document encoding.

Another example aspect of the present disclosure is directed to a computing system for training a machine-learned model for semantic document analysis. The computing system can include one or more processors. The computing system can include a machine-learned semantic document encoding model comprising a first encoding submodel and a second encoding submodel, each of the first and second encoding submodels comprising a sentence encoding portion and a document encoding portion. The sentence encoding portion can be configured to process a plurality of textual blocks to obtain a plurality of textual block representations. The document encoding portion can be configured to process the plurality of textual block representations to obtain a plurality of contextual block representations. The computing system can include one or more tangible, non-transitory computer readable media storing computer-readable instructions that when executed by the one or more processors cause the one or more processors to perform operations. The operations can include obtaining a plurality of first textual blocks and a plurality of second textual blocks, wherein each of the plurality of textual blocks and the plurality of second textual blocks respectively comprise one or more sentences of a first document and one or more sentences of a second document. The operations can include processing the plurality of first textual blocks and the plurality of second textual blocks with the machine-learned semantic document encoding model to respectively obtain a plurality of first contextual block representations and a plurality of second contextual block representations. The operations can include determining, based on at least one of the plurality of first contextual block representations and at least one of the plurality of second contextual block representations, a similarity metric descriptive of a semantic similarity between the first document and the second document. The operations can include evaluating a loss function that evaluates a difference between the similarity metric and ground truth data associated with the first document and the second document. The operations can include adjusting one or more parameters of the machine-learned semantic document encoding model based at least in part on the loss function.

Another example aspect of the present disclosure is directed to one or more tangible, non-transitory computer readable media storing computer-readable instructions that when executed by one or more processors cause the one or more processors to perform operations. The operations can include obtaining a plurality of textual training blocks from one or more training documents, wherein each of the plurality of textual training blocks comprises one or more sentences from the one or more training documents. The operations can include processing each of the plurality of training blocks with a block encoding portion of a machine-learned semantic document encoding model to obtain a respective plurality of textual block representations. The operations can include masking one or more sentences of a textual block representation of the plurality of textual block representations to obtain a masked block representation. The operations can include adding the one or more masked sentences of each the masked block representation to a corpus of candidate sentences comprising a plurality of masked sentences from the one or more training documents. The operations can include processing the plurality of textual block representations with a document encoding portion of the machine-learned semantic document encoding model to respectively obtain a plurality of contextual block representations, wherein the contextual block representation for the masked block representation comprises a multi-class classification of the one or more masked sentences of the masked block representation as being one or more respective sentences of the corpus of candidate sentences. The operations can include evaluating a pre-training loss function that evaluates a difference between the multi-class classification for the masked block representation and ground truth data associated with the masked block representation and the corpus of candidate sentences. The operations can include adjusting one or more parameters of the machine-learned semantic document encoding model based at least in part on the pre-training loss function.

Other aspects of the present disclosure are directed to various systems, apparatuses, non-transitory computer-readable media, user interfaces, and electronic devices.

These and other features, aspects, and advantages of various embodiments of the present disclosure will become better understood with reference to the following description and appended claims. The accompanying drawings, which are incorporated in and constitute a part of this specification, illustrate example embodiments of the present disclosure and, together with the description, serve to explain the related principles.

BRIEF DESCRIPTION OF THE DRAWINGS

Detailed discussion of embodiments directed to one of ordinary skill in the art is set forth in the specification, which makes reference to the appended figures, in which.

Figure 1A:
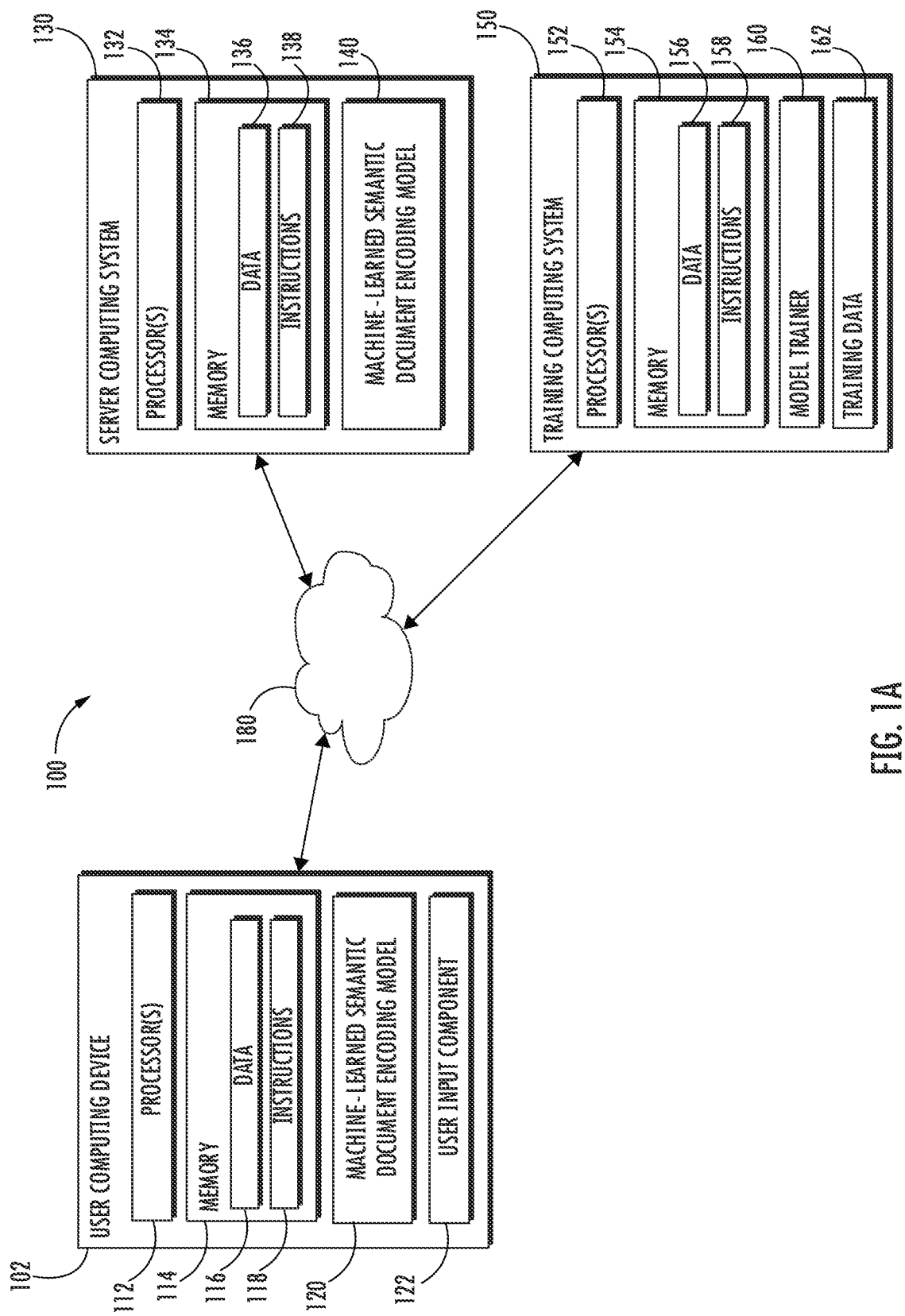
FIG. 1A depicts a block diagram of an example computing system that performs prediction of semantic similarity between documents according to example embodiments of the present disclosure.

Reference numerals that are repeated across plural figures are intended to identify the same features in various implementations.

DETAILED DESCRIPTION

Overview

Generally, the present disclosure is directed to predicting a semantic similarity between documents. More particularly, the present disclosure relates to training and utilization of a machine-learned semantic document encoding model to efficiently predict the semantic similarity between two documents. As an example, two documents can be obtained that each include a plurality of sentences (e.g., books, articles, etc.). The two documents can respectively be parsed into a plurality of first textual blocks and a plurality of second textual blocks (e.g., each block containing sentences(s) from a respective document, etc.). The machine-learned semantic document encoding model can process the first and second textual blocks to obtain a first document encoding and a second document encoding. Based on the first document encoding and the second document encoding, a similarity metric can be determined that describes a semantic similarity between the first document and the second document.

More particularly, the semantic document encoding model can include a first encoding submodel and a second encoding submodel (e.g., two "towers" of a siamese transformer network, etc.). Both of the first and the second encoding submodels (e.g., first and second transformer neural networks, etc.) can include a block encoder portion and a document encoder portion that are configured to process textual blocks in a hierarchical fashion. After parsing the first and second textual blocks from the first and second documents, the first textual blocks and the second textual blocks can be respectively processed using the block encoder portions of the first and second encoding submodels to obtain first textual block representations and second textual block representations. Next, the first textual block representations and the second textual block representations can be respectively processed with the document encoder portions of the first and second encoding submodels to obtain first contextual block representations and second contextual block representations. A first and second document encoding can be respectively determined from the first contextual block representations and the second contextual block representations. A similarity metric that describes a semantic similarity between the two documents can be determined based on the first and second document encodings. In such fashion, by utilizing a hierarchical submodel structure, the machine-learned semantic document encoding model can localize the dependencies between textual segments (e.g., sentences) to those included in a textual block and/or among textual blocks, therefore significantly reducing the quadratic complexity associated with semantic analysis of documents (e.g., attention computation between textual segments, etc.).

A first document and a second document can be obtained by a computing system (e.g., websites, articles, newspapers, blogs, books, etc.). The first document can contain a plurality of first sentences and the second document can include a plurality of second sentences. To process the documents hierarchically, the first document can be parsed into a plurality of first textual blocks, and the second document can be parsed into a plurality of second textual blocks. Each of the first and second textual blocks can include one or more sentences from the first and second documents. As an example, the first document can be a document that includes a plurality of first sentences, and each of the plurality of first textual blocks can include a distinct subset of the plurality of first sentences.

Both the first and second documents can be parsed to fill the pluralities of first and second blocks in a greedy fashion. More particularly, the documents can be split into multiple textual blocks of predefined length so that each textual block can contain one or more natural sentences. As an example, each of the plurality of first textual blocks can include a textual capacity (e.g., a number of textual units that can be parsed into the block, etc.). A first textual block of the plurality of first textual blocks can be filled with as many sentences as possible until the first textual block reaches the predefined maximum textual capacity (e.g., a maximum block length, etc.). When the last textual unit (e.g., sentence, word, character, etc.) cannot be parsed into the first textual block, it can instead be parsed to the next first textual block with available space. As another example, a first textual block can have a textual capacity, and an individual sentence can be longer than the maximum textual capacity (e.g., block length, etc.). To parse the individual sentence according to the maximum textual capacity, the individual sentence can be truncated to fit in the current first textual block. In such fashion, parsing the first document to each of the plurality of first textual blocks in a greedy fashion can greatly reduce the number of padded tokens required given a fixed maximum textual capacity.

Each of the plurality of first textual blocks can be processed with the machine-learned semantic document encoding model. More particularly, the machine-learned semantic document encoding model can include a first encoding submodel and a second encoding submodel. Both the first encoding submodel and the second encoding submodel can include a block encoding portion and a document encoding portion. As an example, the machine-learned semantic document encoding model can be or otherwise include a siamese neural network architecture, where each of the first and second encoding submodels can be a transformer-based hierarchical encoder. Each of the transformer-based hierarchical encoders (e.g., the first and second encoding submodels) can be configured to learn a block level (e.g., sentence level) and document level representation of the documents. In such fashion, the advantages of long distance dependency modeling of self-attention mechanisms inherent to transformer models can be combined with hierarchical document structure modeling for long text representation learning. In some implementations, the parameters of the first encoding submodel can be a set of parameters shared with the second encoding submodel.

The first and second encoding submodels can each include a block encoding portion and a document encoding portion. The block and document encoding portions can process documents (e.g., the first and second documents) in a hierarchical fashion. As an example, the block encoding portion of the first encoding submodel can first process each of the sentences of the plurality of first textual blocks. Next, the document encoding portion can process the output of the block encoding portion to obtain a final document representation.

More particularly, each of the first textual blocks can be processed using the block encoding portion of the first encoding submodel to obtain a respective plurality of first textual block representations. Similarly, each of the second textual blocks can be processed using the block encoding portion of the second encoding submodel to obtain a respective plurality of second textual block representations. As an example, the first and second encoding submodels of the machine-learned semantic document encoding model can first process each plurality of textual blocks with a respective block encoding portion. For example, let $\mathcal{D}$ denote an input document (e.g., the first document, the second document, etc.). With greedy sentence filling, the document $\mathcal{D}$ can be parsed into a sequence of textual sentence blocks $\{S_1, S_2, \ldots, S_{L_d}\}$, where $S_i = \{W_1^i, W_2^i, \ldots, W_{L_s}^i\}$. $S_i$ can be the i-th sentence block in the document. $W_j^i$ can be the j-th word in the i-th sentence block. $L_d$ and $L_s$ can denote the length of a document by sentence blocks and the length of a sentence block by words respectively. The representation of each sentence $S_i$ can be learned with the encoding submodel (e.g., a transformer encoder, etc.). As an example, the encoding submodel can be or otherwise include a transformer encoder that includes multi-head self-attention and a position-wise fully connected feed-forward network with residual connections.

In some implementations, each of the plurality of first textual blocks can be processed with the block encoding portion of the first encoding submodel to obtain sentence tokens. The sentence tokens can respectively correspond to words in each of the one or more first sentences of a first textual block. After obtaining sentence tokens for each of the plurality of first textual blocks, a first sentence token from the sentence tokens can be concatenated with a position embedding that corresponds to the first sentence token to obtain a first textual block representation for the respective first textual block.

Additionally, in some implementations, each of the sentence tokens for a textual block can include an attentional weight. More particularly, the words in a sentence $S_i$ of a textual block can be mapped to a sequence of dense vector representations:

$$E(S_i) = (e_1^i, e_2^i, \ldots, e_{L_s}^i)$$

where $e_j^i = t(W_j^i) + p(W_j^i)$ is the sum of the token embedding and position embedding of word $W_j^i$. The token embedding can be initialized randomly (e.g., during a pre-training phase, etc.). The block encoding portion of the encoding submodel (e.g., a sentence level transformer, etc.) can transform $E(S_i)$ into a sequence of contextualized representations for words in the textual block $\{T_1^i, \ldots, T_2^i, \ldots, T_{L_s}^i\}$. In some implementations, the contextual representation of the first token, alongside the added [CLS] token, can be utilized as the learned representation of the whole sentence block. The final sentence block representation also adds the sentence block position embedding to model the sentence block location in the document. In such fashion, the computing system can process each of the first and second textual blocks with the block encoding portions to obtain a plurality of first textual block representations and a plurality of second textual block representations.

After obtaining the first and second plurality of textual block representations, both can be respectively processed by the machine-learned semantic document encoding model. More particularly, the document encoding portion of the first encoding submodel can be used to process the plurality of first textual block representations to obtain a first document encoding. Similarly, the document encoding portion of the second encoding submodel can be used to process the plurality of second textual block representations to obtain a second document encoding.

In some implementations, with the learned textual block representations from the block encoding portions (e.g., sentence-level transformers, etc.) and the textual block position embeddings, the document encoding portions (e.g., document-level transformer encoders, etc.) can generate a sequence of contextual block representations $\{S_1, S_2, \ldots, S_{L_d}\}$. For example, each of the plurality of first textual block representations can be processed using the document encoding portion of the first encoding submodel to obtain a respective plurality of first contextual block representations. Similarly, each of the plurality of second textual block representations can be processed using the document encoding portion of the second encoding submodel to obtain a respective plurality of second contextual block representations.

In some implementations, the first document encoding can be determined based at least in part on the plurality of contextual block representations. As an example, the first document encoding can be determined by selecting a first contextual block representation of the plurality of first contextual block representations as the representation for the whole document. For example, each of the plurality of first textual block representations can be processed using the document encoding portion of the first encoding submodel to obtain a respective plurality of first contextual block representations. The first contextual block representation of the plurality of contextual block representations can be selected to represent the entire document. After selecting the first contextual block representation, a dense layer can be utilized to transform the first contextual block representation with L2 normalization.

Alternatively, in some implementations, the attentional weights of the sentence tokens of each of the first textual blocks can be utilized to determine a weighted sum of the plurality of first textual block representations. For example, the weighted sum of the sentences of the block level representations can first be computed with attention mechanism: $\Sigma_{i=1}^{L_d} h_i \cdot \text{softmax}(h_i W v)$, where $h_i \in \mathbb{R}^H$ is the learned representation for the i-th block by the block encoding portion (e.g., block-level transformer, etc.). $W \in \mathbb{R}^{H \times V}$ can be a projection matrix and $v \in \mathbb{R}^V$ can represent the attention model parameter. This weighted sum can be concatenated with the document level representation to determine the first document encoding. The document level representation, as described previously, can be the contextual block representation associated with at least one first textual block of the plurality of first textual blocks.

Alternatively, in some implementations, determining the first document encoding can include concatenating a sum of the plurality of first textual block representations with a contextual block representation. The contextual block representation can be the representation associated with at least one textual block of the plurality of first textual blocks. The concatenation of the sum and the at least one textual block can determine the first document encoding.

Alternatively, in some implementations, determining the first document encoding can include concatenating a mean of the plurality of first textual block representations with a contextual block representation. The contextual block representation can be the representation associated with at least one textual block of the plurality of first textual blocks. The concatenation of the sum and the at least one textual block can determine the first document encoding.

Alternatively, in some implementations, determining the first document encoding can include determining the contextual block representation associated with at least one first textual block of the plurality of first textual blocks. More particularly, the contextual block representation associated with the at least one textual block can be selected as the first document encoding.

It should be noted that by processing the documents hierarchically with the block and document encoding portions of the respective encoding submodels, the computational complexity of the semantic similarity prediction can be substantially reduced. As an example, a conventional transformer model can include an attention mechanism used for the transformer model that can be the scaled dot-product attention, which can perform transformation from a query and a set of key-value pairs to an output. The output representation can be defined as a weighted sum of the values, where the weight to each value is computed as the interaction score between the query and the corresponding key normalized by the softmax function. Specifically, given the input query embeddings Q, key embeddings $\mathcal{K}$ and value embeddings $\mathcal{V}$, where $Q \in \mathbb{R}^{b \times l_Q \times H}$, $\mathcal{K} \in \mathbb{R}^{b \times l_{\mathcal{K}} \times H}$, $V \in \mathbb{R}^{b \times l_V \times H}$, the scaled dot-product attention can be defined as:

$$\text{Attention}(Q, \mathcal{K}, V) = \text{softmax}\left(\frac{Q\mathcal{K}^T}{\sqrt{d}}\right)V$$

where $l_Q$, $l_{\mathcal{K}}$, $l_V$ are the number of tokens in each sequence and $l_{\mathcal{K}} = l_V$. b is the batch size and H can represent the hidden size.

To demonstrate the prohibitive memory cost of said conventional transformers, the attention computation of the previous equation can be used as an illustrative example. For example, if $l_{\mathcal{K}} = l_V = l_Q = N$, then the term $Q\mathcal{K}^T$ can have the shape [b, N, N], where N is the maximum input sequence length. A and L can denote the number of attention heads and layers in the machine-learned semantic document encoding model, then the memory complexity of the attention computation in the machine-learned semantic document encoding model can be calculated as $O(b \cdot A \cdot N^2 \cdot L)$. As such, the memory cost of the scaled dot-product attention in the conventional transformer grows quadratically as the increasing of the input sequence length, therefore demanding a prohibitively expensive computational cost for very long input sequences.

Conversely, the machine-learned semantic document encoding model (e.g., a two level hierarchical Transformer model, etc.) can process the same "very long input sequences" without demanding such a prohibitive computational cost. For example, let $L_s$ denote the max sentence block length by tokens. A document can be split into $$\frac{N}{L_s}$$

sentence blocks. The memory complexity of the attention computation of block/document level encoding portions (e.g., Transformer network(s), etc.) can be defined as:

$$b \cdot A \cdot L_s^2 \cdot L \cdot \frac{N}{L_s} + b \times A \times \left(\frac{N}{L_s}\right)^2 \cdot L =$$

$$(L_s^2 \cdot \frac{N}{L_s} + \left(\frac{N}{L_s}\right)^2) \cdot b \cdot A \cdot L = \left(L_s \cdot N + \frac{N^2}{L_s^2}\right) \cdot b \cdot A \cdot L$$

Where it can be assumed that the number of attention heads and the number of layers are the same for the block encoding portion and the document encoding portions of an encoding submodel for simplicity. As such, the memory complexity of the processing performed by the encoding submodel of the machine-learned semantic document encoding model (e.g., a two level hierarchical Transformer, etc.) can be represented as $$O\left(\frac{N^2}{L_s^2} \cdot b \cdot A \cdot L\right).$$

Compared to the $O(b \cdot A \cdot N^2 \cdot L)$ complexity inherent to conventional transformers, usage of the machine-learned semantic document encoding model of the present disclosure therefore reduces memory and/or computational complexity by a factor of $L_s^2$ with only performing local self-attention over tokens in the same sentence block.

A similarity metric can be determined based at least in part on the first document encoding and the second document encoding (e.g., a comparison between the document encodings, etc.). As an example, a cosine similarity can be determined between the pooled sequence outputs corresponding to the two documents cos ($E(d_s)$, $E(d_c)$) (e.g., the first document encoding and the second document encoding). It should be noted that although a cosine similarity can be used to determine a similarity metric between the first document encoding and the second document encoding, any conventional function can be utilized to determine a similarity between the first and second document encodings. As an example, in some implementations one or more final layer(s) of the machine-learned semantic document encoding model can process the first document encoding and the second document encoding to determine a similarity metric that describes the semantic similarity between the first document and the second document. For example, the similarity metric can be or otherwise include a binary prediction as to whether the first document and second document are semantically similar. For another example, the similarity metric can be or otherwise include a predicted level of semantic similarity between the two documents (e.g., a percentage metric, etc.).

In some implementations, the computing system can index the first document encoding as a representation of the first document for a search system. More particularly, the computing system can utilize the first document encoding as a latent embedding within a search system to facilitate search operations for the first document. Similarly, the computing system can index the second document encoding as a representation of the second document for the search system.

In some implementations, a loss function can be evaluated that evaluates a difference between the similarity metric and a ground truth label associated with the first document and the second document. As an example, the loss function can evaluate a binary cross-entropy loss between the semantic similarity metric and the ground truth matching label. In some implementations, one or more parameters of the machine-learned semantic document encoding model can be adjusted based at least in part on the loss function. As an example, the loss function can be backpropagated through the machine-learned semantic document encoding model to determine values associated with one or more parameters of the model to be updated. The one or more parameters can be updated to reduce the difference evaluated by the loss function (e.g., using an optimization procedure, such as a gradient descent algorithm). It should be noted that the ground truth label associated with the documents can be derived based on various characteristics of the documents. As an example, the ground truth label may evaluate commonalities between the various documents (e.g., citations, hyperlinks, click data, historical browsing data, etc.).

In some implementations, the machine-learned semantic document encoding model can be trained prior to processing of textual blocks (e.g., "pre-trained"). More particularly, a plurality of textual training blocks can be obtained from one or more training documents. Each of the plurality of textual training blocks can include one or more sentences from the one or more training documents. As an example, sentences of the textual training documents can be parsed to the plurality of textual training blocks in the same or a substantially similar manner as the first and second documents were parsed to the first and second training blocks.

In some implementations, after obtaining the plurality of textual training blocks, one or more sentences of a textual training block can be masked to obtain a masked training block. Alternatively, in some implementations, the plurality of textual training blocks can be processed with a block encoding portion of an encoding submodel (e.g., the first encoding submodel, the second encoding submodel, etc.) of the machine-learned semantic document encoding model to obtain a respective plurality of textual block representations. One or more sentences of a textual block representation can be masked to obtain a masked block representation.

In some implementations, masking one or more sentences of the masked block representation (or the textual training block) can include masking one word of each of the one or more sentences (e.g., replacing the word with a masking token, etc.). As an example, each sentence of the masked block representation can be replaced with a respective masking token. As such, the masked block representation can include a plurality of sentences that are each fully masked, or may include a plurality of sentences where one word of one sentence is masked. It should be noted that the level of sentence masking can be adjusted over a number of training iterations.

More particularly, let D={$h_1$, $h_2$, . . . , $h_{L_d}$} denote a sequence of textual block representations obtained from processing a respective sequence of textual training blocks using the block encoding portion of an encoding submodel of the machine-learned semantic document encoding model (e.g., a sentence level transformer, etc.). For each training document in a current training batch, m sentence blocks can be randomly sampled such that $\mathcal{M} = \{h_k | h_k \in \mathbb{R}^H, k \in \mathcal{K}\}$, and these sampled sentence blocks can be replaced with a randomly initialized masked sentence block vector $\hat{h} \in \mathbb{R}^H$. For example, if the 3rd and 5th sentence block are randomly selected for masking, the masked document becomes $\hat{D}=\{h_1, h_2, \hat{h}, h_4, \hat{h}, h_6, \ldots, h_{L_d}\}$. This dynamic sampling process can be repeated for every document in a batch in each step, so that the same document may get different masked sentence block positions in different steps. This dynamic masking strategy can enable the model to predict a larger range of sentence blocks in a document compared with the opposite static masking.

In some implementations, the one or more masked sentences of the masked block representation can be added to a corpus of candidate sentences. The corpus of candidate sentences can include a plurality of masked sentences from the one or more training documents. As an example, sentences from each of the one or more training documents can be masked over a number of training iterations. The corpus of candidate sentences can include every masked sentence from each of the one or more training documents, and can also include the one or more masked sentences of the masked block representation. In such fashion, the corpus of candidate sentences can facilitate classification of the masked sentences as a multi-class classification problem.

In some implementations, the plurality of textual block representations can be processed with a document encoding portion of an encoding submodel (e.g., a first encoding submodel, second encoding submodel, etc.) of the machine-learned semantic document encoding model to obtain a respective plurality of contextual block representations. The contextual block representation for the masked training block can include a multi-class classification output that includes a predicted similarity between the masked training block and each of a plurality of additional masked training blocks from the training batch. Processing and obtaining the multi-class classification output will be discussed in greater detail with regards to FIG. 4.

More particularly, to perform prediction of the masked block representation, a multi-class sentence block classification setting can be considered. To facilitate this classification, all masked sentences of all masked sentence blocks can be collected in a batch as a corpus of candidate sentences from which the machine-learned semantic document encoding model can try to predict the correct sentence block. As an example, for each masked sentence block position, the original sentence block in the current position can be utilized as a positive example, and the other co-masked sentence blocks in the current document and in the other documents of the same batch can be utilized as the negative examples.

As an example, the document encoding portion of an encoding submodel of the machine-learned semantic document encoding model can process the masked document $\hat{D}$ to get a sequence of contextual sentence block representations $\{\hat{S}_1, \hat{S}_2, \ldots, \hat{S}_{L_d}\}$. $\hat{S}_k$ can be used to predict the original sentence block representation $h_k$. Given a batch of B masked sentence blocks with the predicted sentence block representation $\hat{S} \in \mathbb{R}^{B \times H}$ and the ground truth sentence block representation $h \in \mathbb{R}^{B \times H}$ where B=b×m, a pairwise similarity matrix can be computed for every masked sentence block pair in the current batch as:

$$Sim(\hat{S}, h) = \hat{S} h^T$$

where $Sim(\hat{S}, h) \in \mathbb{R}^{B \times B}$ and where $Sim(\hat{S}_j, h_i)$ can be the predicted similarity between the j-th predicted sentence block representation and the i-th sentence block class. In some implementations, this can be normalized with a softmax function to transform it to the predicted probability for the the i-th sentence block class as follows:

$$p(h_i \mid \hat{S}_j) = \frac{\exp(Sim(\hat{S}_j, h_i))}{\sum_{r=1}^{B} \exp(Sim(\hat{S}_j, h_r))}$$

As such, all the sentence blocks $\{h_r\}$, where $r \in [1, B]$, $r \neq j$, can be treated as randomly sampled negative classes for $\hat{S}_j$. In some implementations, a pre-training loss function can be evaluated that evaluates a difference between the multi-class classification for the masked block representation and ground truth data associated with the masked block representation and the corpus of candidate sentences. More particularly, the cross-entropy loss can be computed over all masked sentence blocks and the pre-training loss function:

$$\mathcal{L}_{sp} = -\frac{1}{B}\sum_{i=1}^{B}\sum_{j=1}^{B} 1\{j = i\} \log p(h_i \mid \hat{S}_j)$$

$$\mathcal{L}_{pretrain} = \mathcal{L}_{sp} + \mathcal{L}_{wp}$$

where $\mathcal{L}_{sp}$ and $\mathcal{L}_{wp}$ denote the masked sentence block prediction loss and the masked word prediction loss respectively. In some implementations, one or more parameters of the machine-learned semantic document encoding model can be adjusted based at least in part on the pre-training loss function.

In some implementations, the similarity metric can be utilized for additional downstream tasks (e.g., machine learning tasks, etc.). As an example, the similarity metric can be utilized to cluster at least one of the first and second documents (e.g., k-means clustering, hierarchical clustering, etc.). As another example, the similarity metric can be utilized to classify at least one of the first document and the second documents. As yet another example, the similarity metric itself can serve as an input to an additional machine-learned model. In such fashion, the similarity metric can be utilized for a variety of tasks ranging from indexing, classification, and clustering of documents.

The present disclosure provides a number of technical effects and benefits. As one technical effect and benefit, the systems and methods of the present disclosure provide a computationally efficient method to predict the semantic similarity between two documents. For example, prediction of semantic similarity between documents benefits a large family of applications, including but not limited to ad-hoc retrieval, question answering and recommender systems. However, conventional machine-learning models for semantic prediction are generally limited to short portions of text content (e.g., one or two sentences, etc.) due to the prohibitive computational expenses associated with the quadratic computational complexity of these conventional models. Conversely, the systems and methods of the present disclosure provide a computationally efficient method to predict semantic similarity between entire documents (e.g., potentially thousands of sentences, etc.), therefore significantly reducing the computational resources required to perform semantic matching between documents. Thus, versus past prediction techniques, the present disclosure can be utilized to predict semantic similarity between long documents, and can further result in savings of resources such as memory usage, network bandwidth usage, etc.

With reference now to the Figures, example embodiments of the present disclosure will be discussed in further detail.

Example Devices and Systems

FIG. 1A depicts a block diagram of an example computing system 100 that performs prediction of semantic similarity between documents according to example embodiments of the present disclosure. The system 100 includes a user computing device 102, a server computing system 130, and a training computing system 150 that are communicatively coupled over a network 180.

The user computing device 102 can be any type of computing device, such as, for example, a personal computing device (e.g., laptop or desktop), a mobile computing device (e.g., smartphone or tablet), a gaming console or controller, a wearable computing device, an embedded computing device, or any other type of computing device.

The user computing device 102 includes one or more processors 112 and a memory 114. The one or more processors 112 can be any suitable processing device (e.g., a processor core, a microprocessor, an ASIC, a FPGA, a controller, a microcontroller, etc.) and can be one processor or a plurality of processors that are operatively connected. The memory 114 can include one or more non-transitory computer-readable storage mediums, such as RAM, ROM, EEPROM, EPROM, flash memory devices, magnetic disks, etc., and combinations thereof. The memory 114 can store data 116 and instructions 118 which are executed by the processor 112 to cause the user computing device 102 to perform operations.

In some implementations, the user computing device 102 can store or include one or more machine-learned semantic document encoding models 120. For example, the machine-learned semantic document encoding models 120 can be or can otherwise include various machine-learned models such as transformer models, neural networks (e.g., deep neural networks) or other types of machine-learned models, including non-linear models and/or linear models. Neural networks can include feed-forward neural networks, recurrent neural networks (e.g., long short-term memory recurrent neural networks), convolutional neural networks or other forms of neural networks. Example machine-learned semantic document encoding models 120 are discussed with reference to FIGS. 1-4.

In some implementations, the one or more machine-learned semantic document encoding models 120 can be received from the server computing system 130 over network 180, stored in the user computing device memory 114, and then used or otherwise implemented by the one or more processors 112. In some implementations, the user computing device 102 can implement multiple parallel instances of a single machine-learned semantic document encoding model 120 (e.g., to perform parallel semantic document encoding across multiple instances of the machine-learned semantic document encoding model).

More particularly, the machine-learned semantic document encoding model 120 can be utilized to predict a semantic similarity between two documents. As an example, two documents can be obtained that each include a plurality of sentences (e.g., via network(s) 180, etc.). The two documents can respectively be parsed into a plurality of first textual blocks and a plurality of second textual blocks (e.g., each block containing sentences(s) from a respective document, etc.). The machine-learned semantic document encoding model 120 can include a first encoding submodel and a second encoding submodel (e.g., two "towers" of a siamese transformer network, etc.). Both of the first and the second encoding submodels (e.g., first and second transformer neural networks, etc.) can include a block encoder portion and a document encoder portion that are configured to process textual blocks in a hierarchical fashion. The machine-learned semantic document encoding model 120 can obtain the first and second textual blocks, and the first textual blocks and the second textual blocks can be respectively processed using the block encoder portions of the first and second encoding submodels to obtain first textual block representations and second textual block representations. Next, the first textual block representations and the second textual block representations can be respectively processed with the document encoder portions of the first and second encoding submodels to obtain first contextual block representations and second contextual block representations. A first and second document encoding can be respectively determined from the first contextual block representations and the second contextual block representations, and a similarity metric can be determined based on the first and second document encodings. In such fashion, by utilizing a hierarchical submodel structure, the machine-learned semantic document encoding model 120 can localize the dependencies between textual segments (e.g., sentences) to those included in a textual block and/or among textual blocks, therefore significantly reducing the quadratic complexity associated with semantic analysis of documents (e.g., attention computation between textual segments, etc.).

Additionally, or alternatively, one or more machine-learned semantic document encoding models 140 can be included in or otherwise stored and implemented by the server computing system 130 that communicates with the user computing device 102 according to a client-server relationship. For example, the machine-learned semantic document encoding models 140 can be implemented by the server computing system 130 as a portion of a web service (e.g., a document-level semantic similarity prediction service). Thus, one or more models 120 can be stored and implemented at the user computing device 102 and/or one or more models 140 can be stored and implemented at the server computing system 130.

The user computing device 102 can also include one or more user input component 122 that receives user input. For example, the user input component 122 can be a touch-sensitive component (e.g., a touch-sensitive display screen or a touch pad) that is sensitive to the touch of a user input object (e.g., a finger or a stylus). The touch-sensitive component can serve to implement a virtual keyboard. Other example user input components include a microphone, a traditional keyboard, or other means by which a user can provide user input.

The server computing system 130 includes one or more processors 132 and a memory 134. The one or more processors 132 can be any suitable processing device (e.g., a processor core, a microprocessor, an ASIC, a FPGA, a controller, a microcontroller, etc.) and can be one processor or a plurality of processors that are operatively connected. The memory 134 can include one or more non-transitory computer-readable storage mediums, such as RAM, ROM, EEPROM, EPROM, flash memory devices, magnetic disks, etc., and combinations thereof. The memory 134 can store data 136 and instructions 138 which are executed by the processor 132 to cause the server computing system 130 to perform operations.

In some implementations, the server computing system 130 includes or is otherwise implemented by one or more server computing devices. In instances in which the server computing system 130 includes plural server computing devices, such server computing devices can operate according to sequential computing architectures, parallel computing architectures, or some combination thereof.

As described above, the server computing system 130 can store or otherwise include one or more machine-learned semantic document encoding models 140. For example, the models 140 can be or can otherwise include various machine-learned models. Example machine-learned models include neural networks or other multi-layer non-linear models. Example neural networks include feed forward neural networks, deep neural networks, recurrent neural networks, and convolutional neural networks. Example models 140 are discussed with reference to FIGS. 2-4.

The user computing device 102 and/or the server computing system 130 can train the models 120 and/or 140 via interaction with the training computing system 150 that is communicatively coupled over the network 180. The training computing system 150 can be separate from the server computing system 130 or can be a portion of the server computing system 130.

The training computing system 150 includes one or more processors 152 and a memory 154. The one or more processors 152 can be any suitable processing device (e.g., a processor core, a microprocessor, an ASIC, a FPGA, a controller, a microcontroller, etc.) and can be one processor or a plurality of processors that are operatively connected. The memory 154 can include one or more non-transitory computer-readable storage mediums, such as RAM, ROM, EEPROM, EPROM, flash memory devices, magnetic disks, etc., and combinations thereof. The memory 154 can store data 156 and instructions 158 which are executed by the processor 152 to cause the training computing system 150 to perform operations. In some implementations, the training computing system 150 includes or is otherwise implemented by one or more server computing devices.

The training computing system 150 can include a model trainer 160 that trains the machine-learned models 120 and/or 140 stored at the user computing device 102 and/or the server computing system 130 using various training or learning techniques, such as, for example, backwards propagation of errors. For example, a loss function can be back-propagated through the model(s) to update one or more parameters of the model(s) (e.g., based on a gradient of the loss function). Various loss functions can be used such as mean squared error, likelihood loss, cross entropy loss, hinge loss, and/or various other loss functions. Gradient descent techniques can be used to iteratively update the parameters over a number of training iterations.

In some implementations, performing backwards propagation of errors can include performing truncated back-propagation through time. The model trainer 160 can perform a number of generalization techniques (e.g., weight decays, dropouts, etc.) to improve the generalization capability of the models being trained.

In particular, the model trainer 160 can train the machine-learned semantic document encoding models 120 and/or 140 based on a set of training data 162. More particularly, the model trainer 160 can also "pre-train" the machine-learned semantic document encoding models 120 and/or 140 using the training data 162. As an example, the training data 162 can include a plurality of training documents that each include a plurality of sentences.

In some implementations, if the user has provided consent, the training examples can be provided by the user computing device 102. Thus, in such implementations, the model 120 provided to the user computing device 102 can be trained by the training computing system 150 on user-specific data received from the user computing device 102. In some instances, this process can be referred to as personalizing the model.

The model trainer 160 includes computer logic utilized to provide desired functionality. The model trainer 160 can be implemented in hardware, firmware, and/or software controlling a general purpose processor. For example, in some implementations, the model trainer 160 includes program files stored on a storage device, loaded into a memory and executed by one or more processors. In other implementations, the model trainer 160 includes one or more sets of computer-executable instructions that are stored in a tangible computer-readable storage medium such as RAM hard disk or optical or magnetic media.

The network 180 can be any type of communications network, such as a local area network (e.g., intranet), wide area network (e.g., Internet), or some combination thereof and can include any number of wired or wireless links. In general, communication over the network 180 can be carried via any type of wired and/or wireless connection, using a wide variety of communication protocols (e.g., TCP/IP, HTTP, SMTP, FTP), encodings or formats (e.g., HTML, XML), and/or protection schemes (e.g., VPN, secure HTTP, SSL).

FIG. 1A illustrates one example computing system that can be used to implement the present disclosure. Other computing systems can be used as well. For example, in some implementations, the user computing device 102 can include the model trainer 160 and the training dataset 162. In such implementations, the models 120 can be both trained and used locally at the user computing device 102. In some of such implementations, the user computing device 102 can implement the model trainer 160 to personalize the models 120 based on user-specific data.

Figure 1B:
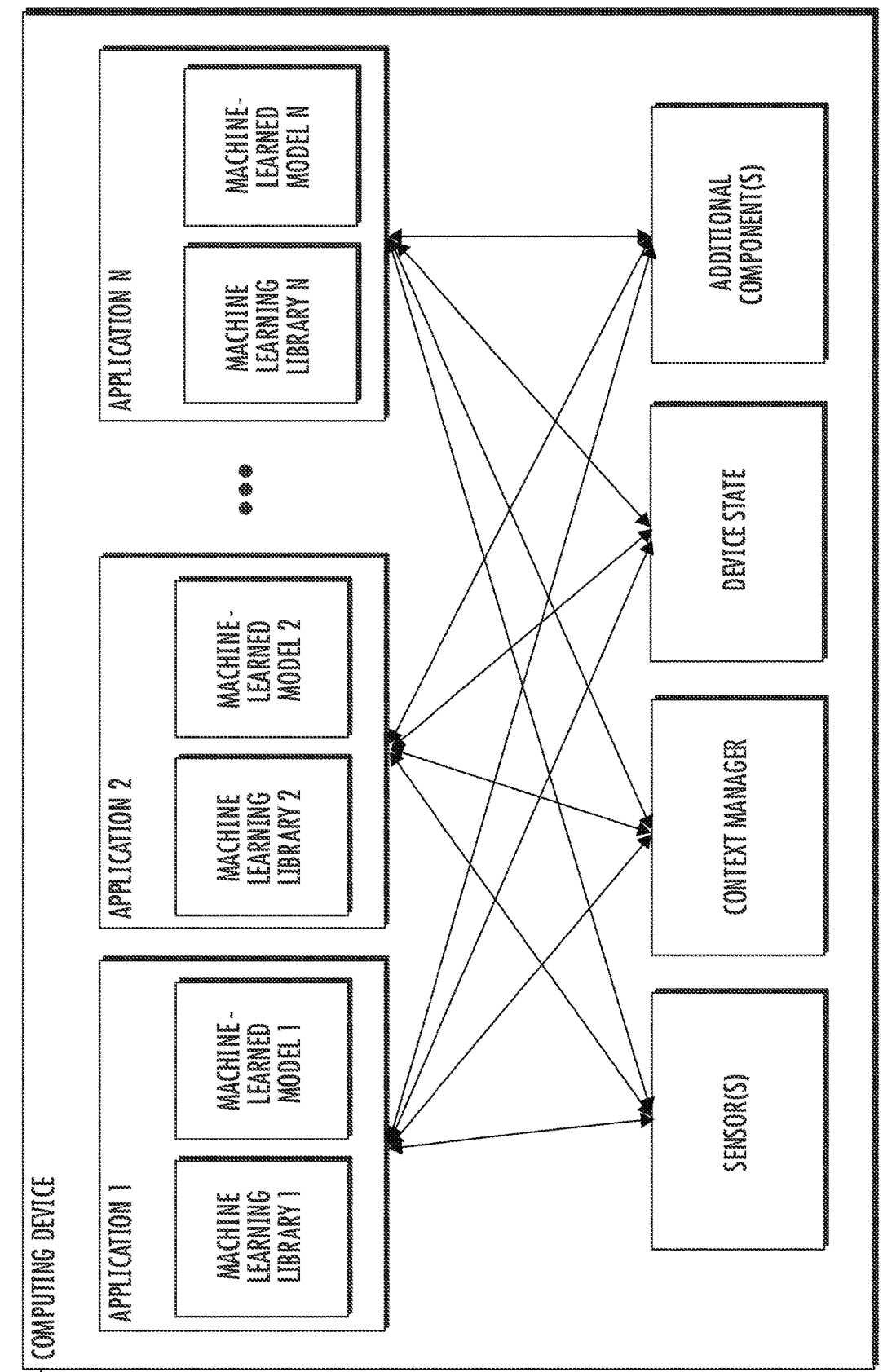
FIG. 1B depicts a block diagram of an example computing device that performs prediction of semantic similarity between documents according to example embodiments of the present disclosure.

FIG. 1B depicts a block diagram of an example computing device 10 that performs prediction of semantic similarity between documents according to example embodiments of the present disclosure. The computing device 10 can be a user computing device or a server computing device.

The computing device 10 includes a number of applications (e.g., applications 1 through N). Each application contains its own machine learning library and machine-learned model(s). For example, each application can include a machine-learned model. Example applications include a text messaging application, an email application, a dictation application, a virtual keyboard application, a browser application, etc.

As illustrated in FIG. 1B, each application can communicate with a number of other components of the computing device, such as, for example, one or more sensors, a context manager, a device state component, and/or additional components. In some implementations, each application can communicate with each device component using an API (e.g., a public API). In some implementations, the API used by each application is specific to that application.

Figure 1C:
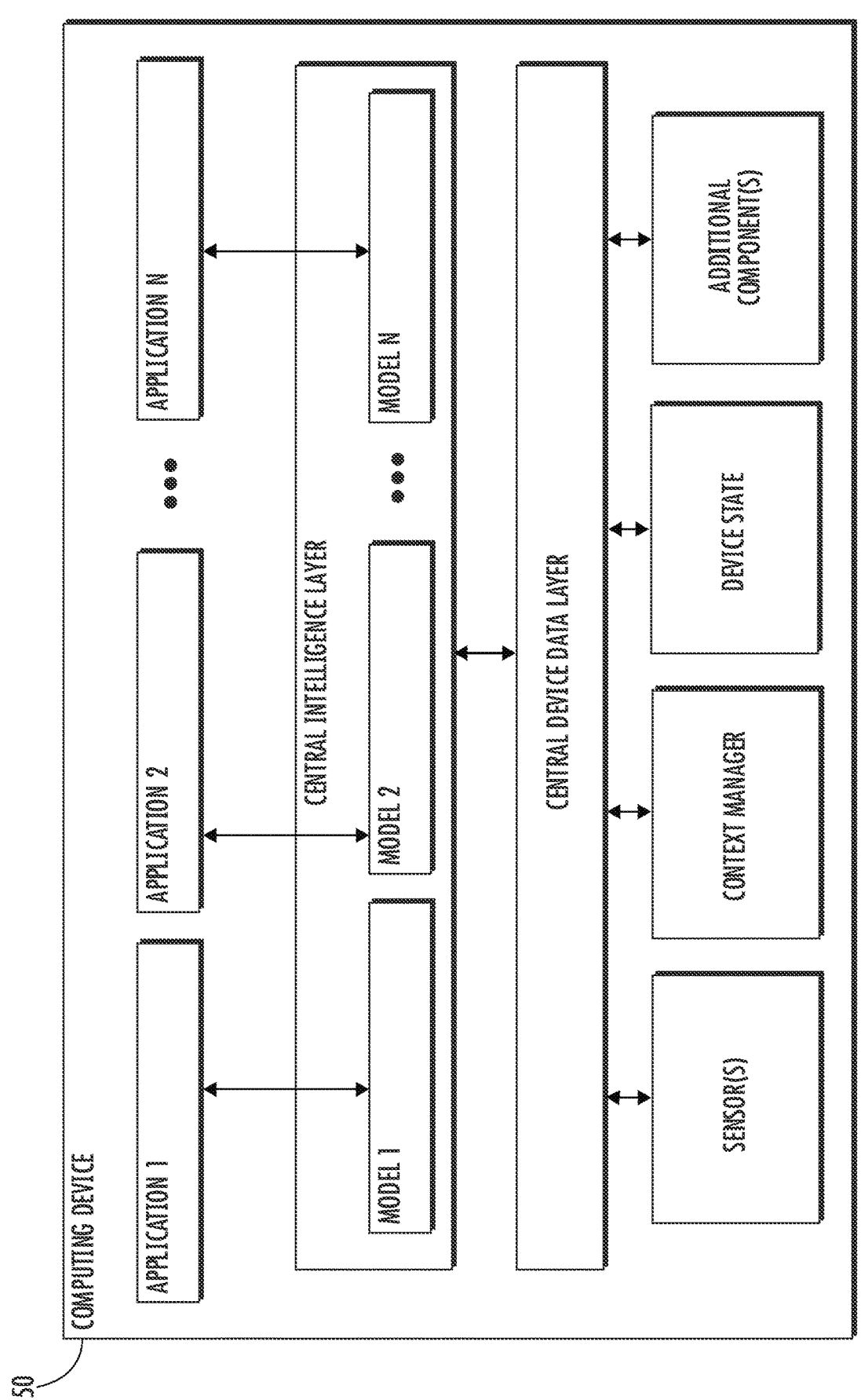
FIG. 1C depicts a block diagram of an example computing device that performs training of a machine-learned semantic document encoding model according to example embodiments of the present disclosure.

FIG. 1C depicts a block diagram of an example computing device 50 that performs training of a machine-learned semantic document encoding model according to example embodiments of the present disclosure. The computing device 50 can be a user computing device or a server computing device.

The computing device 50 includes a number of applications (e.g., applications 1 through N). Each application is in communication with a central intelligence layer. Example applications include a text messaging application, an email application, a dictation application, a virtual keyboard application, a browser application, etc. In some implementations, each application can communicate with the central intelligence layer (and model(s) stored therein) using an API (e.g., a common API across all applications).

The central intelligence layer includes a number of machine-learned models. For example, as illustrated in FIG. 1C, a respective machine-learned model (e.g., a model) can be provided for each application and managed by the central intelligence layer. In other implementations, two or more applications can share a single machine-learned model. For example, in some implementations, the central intelligence layer can provide a single model (e.g., a single model) for all of the applications. In some implementations, the central intelligence layer is included within or otherwise implemented by an operating system of the computing device 50.

The central intelligence layer can communicate with a central device data layer. The central device data layer can be a centralized repository of data for the computing device 50. As illustrated in FIG. 1C, the central device data layer can communicate with a number of other components of the computing device, such as, for example, one or more sensors, a context manager, a device state component, and/or additional components. In some implementations, the central device data layer can communicate with each device component using an API (e.g., a private API).

Example Model Arrangements

Figure 2:
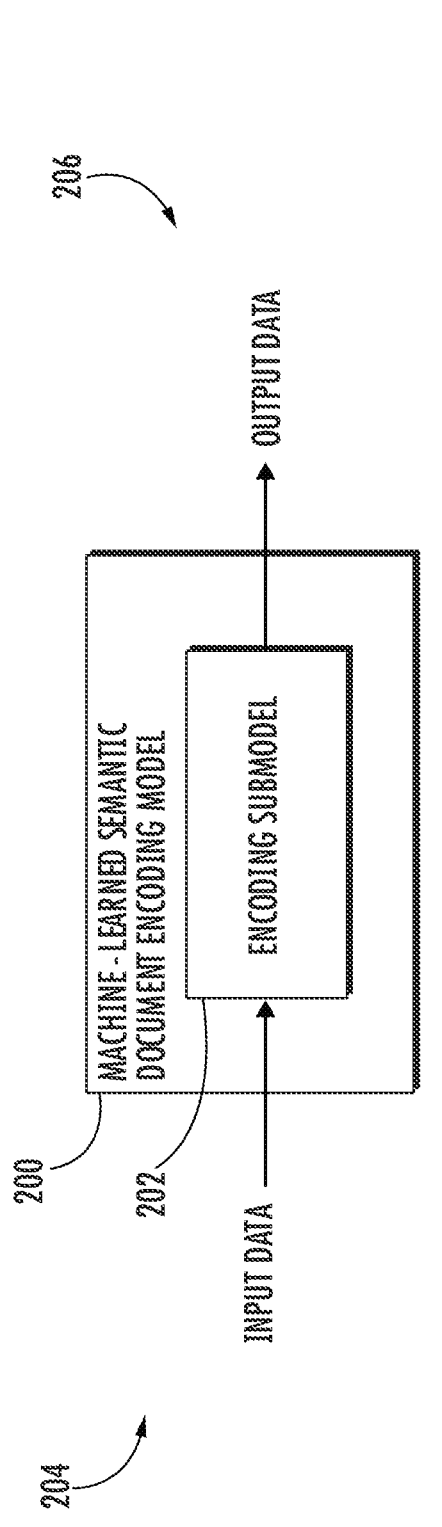
FIG. 2 depicts a block diagram of an example machine-learned semantic document encoding model according to example embodiments of the present disclosure.

FIG. 2 depicts a block diagram of an example machine-learned semantic document encoding model 200 according to example embodiments of the present disclosure. In some implementations, the machine-learned semantic document encoding model 200 is trained to receive a set of input data 204 descriptive of a document and, as a result of receipt of the input data 204, provide output data 206 descriptive of a document encoding corresponding to the document. Further, the machine-learned semantic document encoding model 200 can include a first document encoding submodel and a second document encoding submodel. Thus, in some implementations, the machine-learned semantic document encoding model 200 can include a document encoding submodel 202 that is operable to process the input data 204 (e.g., a document, etc.) to obtain output data 206 including a document encoding that is representative of the document included in the input data 204.

Figure 3:
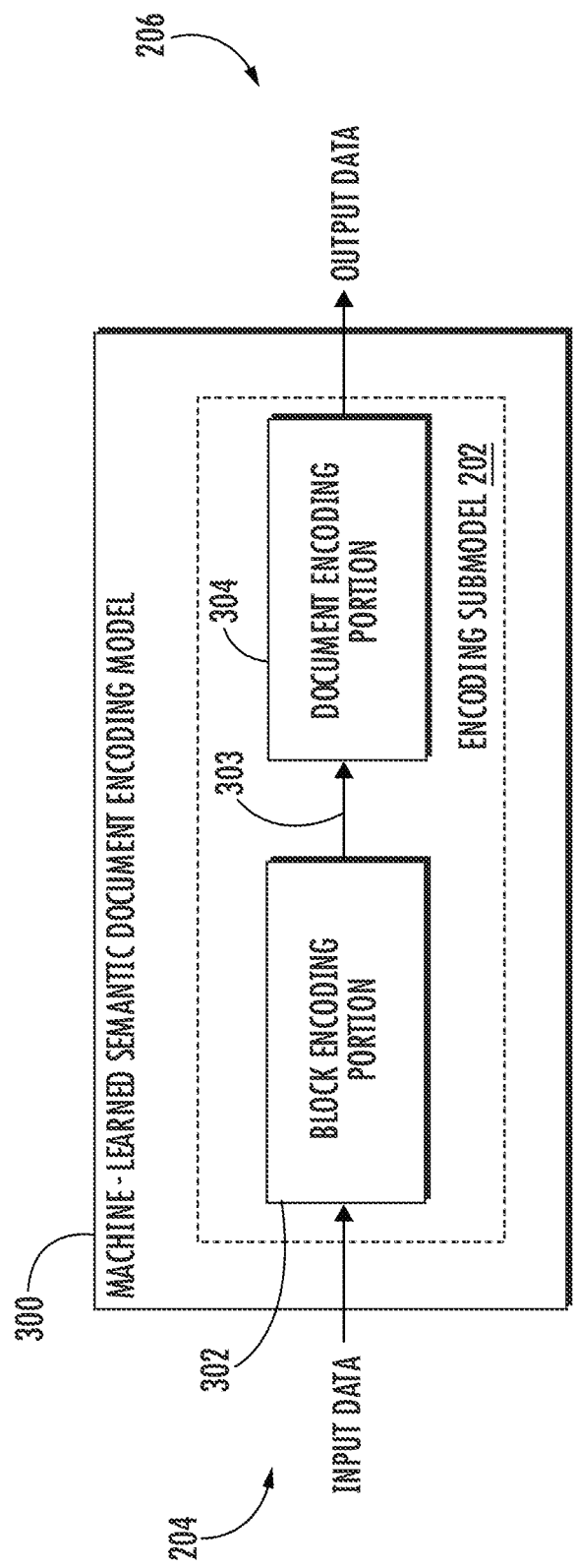
FIG. 3 depicts a block diagram of an example submodel of a machine-learned semantic document encoding model according to example embodiments of the present disclosure.

FIG. 3 depicts a block diagram of an example submodel of a machine-learned semantic document encoding model 300 according to example embodiments of the present disclosure. The machine-learned semantic document encoding model 300 is similar to machine-learned semantic document encoding model 200 of FIG. 2 except that machine-learned semantic document encoding model 300 further includes the block encoding portion 302 and the document encoding portion 304 of the encoding submodel 202.

More particularly, the input data 204 can be descriptive of a plurality of textual blocks. Each of the textual blocks can be processed using the block encoding portion 302 of the encoding submodel 202 to obtain a respective plurality of first textual block representations 303. The respective plurality of first textual block representations 303 can be processed with the document encoding portion 304 of the first encoding submodel 202 to obtain a document encoding 206.

Figure 4A:
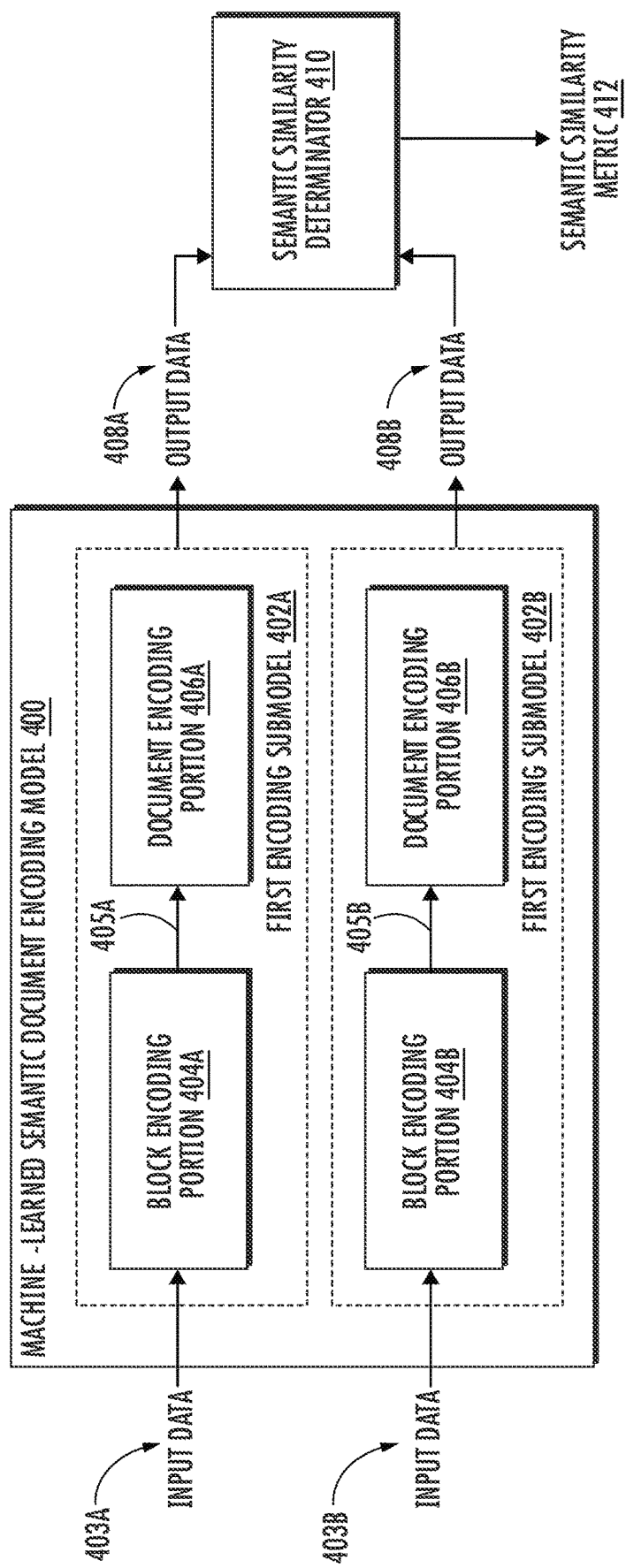
FIG. 4A depicts a block diagram of an example dual-submodel machine-learned semantic document encoding model architecture according to example embodiments of the present disclosure.

FIG. 4A depicts a block diagram of an example dual-submodel machine-learned semantic document encoding model architecture according to example embodiments of the present disclosure. The machine-learned semantic document encoding model 400 is similar to machine-learned semantic document encoding model 300 of FIG. 3 except that machine-learned semantic document encoding model 400 further includes a first encoding submodel 402A and a second encoding submodel 402B, which respectively include a block encoding portion 404A/404B and a document encoding portion 406A/406B.

More particularly, the input data 403A can include a first document and the input data 403B can include a second document. The first document 403A can contain a plurality of first sentences and the second document 403B can include a plurality of second sentences. To process the documents hierarchically, the first document 403A can be parsed into a plurality of first textual blocks, and the second document 403B can be parsed into a plurality of second textual blocks. Each of the first and second textual blocks can include one or more sentences from the first and second documents. As an example, the first document 403A can be a document that includes a plurality of first sentences, and each of the plurality of first textual blocks can include a distinct subset of the plurality of first sentences.

Each of the plurality of first textual blocks from the first document 403A can be processed with the machine-learned semantic document encoding model 400. More particularly, the machine-learned semantic document encoding model 400 can include a first encoding submodel 402A and a second encoding submodel 402B. Both the first encoding submodel 402A and the second encoding submodel 402B can respectively include a block encoding portion 404A/404B and a document encoding portion 406A/406B. As an example, the machine-learned semantic document encoding model 400 can be or otherwise include a siamese neural network architecture, where each of the first and second encoding submodels 402A/402B can be a transformer-based hierarchical encoder. Each of the transformer-based hierarchical encoders (e.g., the first and second encoding submodels 402A/402B) can be configured to learn a block level (e.g., sentence level) and document level representation of the documents.

The first encoding submodel 402A and the second encoding submodel 402B can respectively process the first document 403A and the second documents 403B (e.g., their associated pluralities of textual blocks, etc.) in a hierarchical fashion. As an example, the block encoding portion 404A of the first encoding submodel 402A can first process each of the sentences of the plurality of first textual blocks from the first document 403A. Next, the document encoding portion 406A can process the output of the block encoding portion 404A to obtain a final document representation 408A. Similarly, the block encoding portion 404B of the second encoding submodel 402B can process each of the sentences of the plurality of second textual blocks from the second document 403B. Next, the document encoding portion 406B of the second document encoding submodel 402B can process the output of the block encoding portion 404B to obtain a final document representation 408B.

More particularly, each of the first textual blocks of first document 403A can be processed using the block encoding portion 404A of the first encoding submodel 402A to obtain a respective plurality of first textual block representations 405A. Similarly, each of the second textual blocks of the second document 403B can be processed using the block encoding portion 404B of the second encoding submodel 402B to obtain a respective plurality of second textual block representations 405B. After obtaining the first plurality of textual block representations 405A and the second plurality of textual block representations 405B, both can be respectively processed by the machine-learned semantic document encoding model 400. More particularly, the document encoding portion 406A of the first encoding submodel 402A can be used to process the plurality of first textual block representations 405A to obtain a first document encoding 408A. Similarly, the document encoding portion 406B of the second encoding submodel 402B can be used to process the plurality of second textual block representations 405B to obtain a second document encoding 408B.

The semantic similarity determinator 410 can be used to determine a semantic similarity metric 412 descriptive of a semantic similarity between the first document 403A and the second document 403B. The semantic similarity metric 412 can be based on the first document encoding 408A and the second document encoding 408B. As an example, a cosine similarity can be determined by the semantic similarity determinator 410 between the pooled sequence output corresponding to the two documents encodings $\cos(E(d_s), E(d_c))$ (e.g., the first document encoding 408A and the second document encoding 408B). It should be noted that although a cosine similarity can be used to determine the similarity metric 412 between the first document encoding 408A and the second document encoding 408B, any conventional function can be utilized to determine a similarity between the first and second document encodings 408A/408B.

Figure 4B:
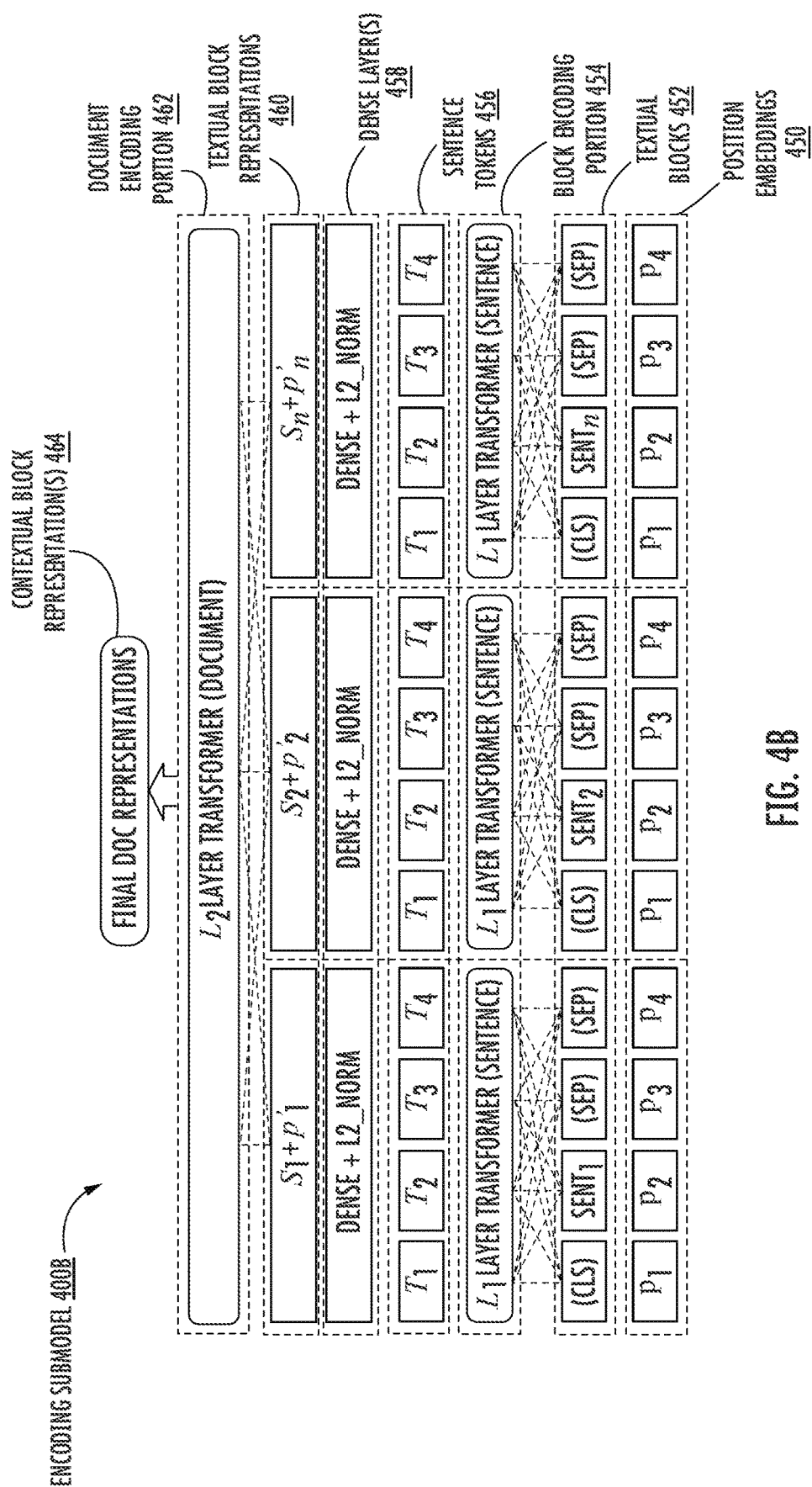
FIG. 4B depicts a block diagram of an example encoding submodel of a machine-learned semantic document encoding model architecture according to example embodiments of the present disclosure.

FIG. 4B depicts a block diagram of an example encoding submodel 400B of a machine-learned semantic document encoding model architecture according to example embodiments of the present disclosure. The encoding submodel 400B can include a block encoding portion 454 and a document encoding portion 462. More particularly, a document can be parsed into a plurality of textual blocks 452. Further, the position of each textual block within the document can be represented by a position embedding 450. The block encoding portion 454 of the encoding submodel (e.g., a sentence level transformer, etc.) can transform the textual blocks 452, alongside the position embeddings 450, into a sequence of textual block representations 460.

More particularly, the block encoding portion 454 can process the textual blocks 452 and the position embeddings 450 to obtain a sentence token representation for each sentence of the textual blocks 452. At least one of these sentence token representations can be processed using one or more dense layer(s) 458 to obtain textual block representations 460 for each of the textual blocks 452. As an example, for a first sentence of a first textual block 452, the sentence token 456 corresponding to the first sentence can be processed using the dense layer(s) 458 (e.g., according to an L2 normalization function, etc.) to obtain a textual block representation 460 for the textual block 452 of the sentence. The textual block representation can be or otherwise include a combination of the sentence token 456 and position embedding 450 corresponding to the sentence. Each of the textual block representations 460 can be processed using the document encoding portion 462 to respectively obtain contextual block representations 464.

Figure 5:
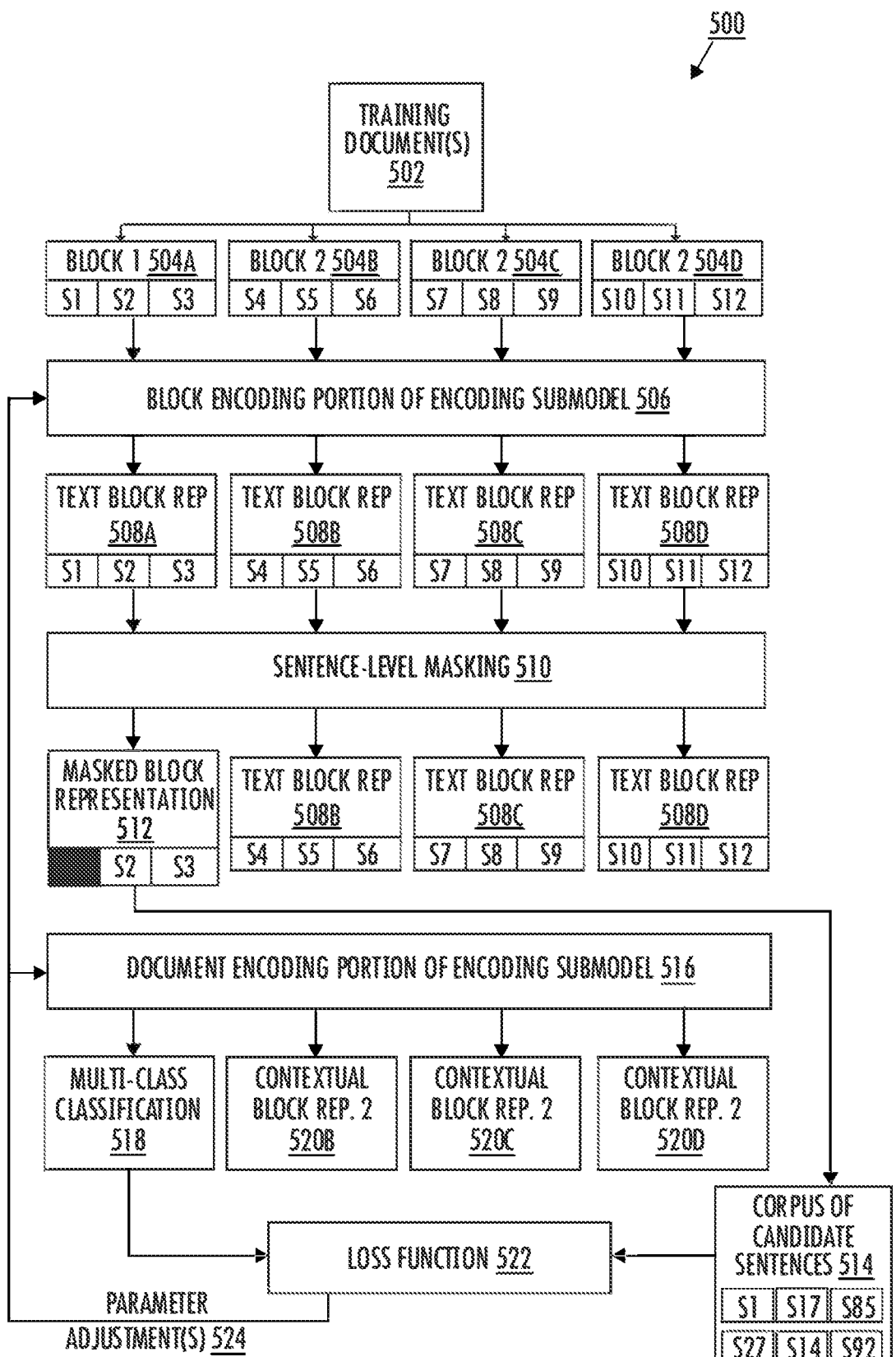
FIG. 5 depicts a data flow diagram for a method for pre-training a machine-learned semantic document encoding model.

FIG. 5 depicts a data flow diagram for a method 500 for pre-training a machine-learned semantic document encoding model. One or more training document(s) 502 of a training batch can be obtained. A plurality of textual training blocks 504A-504D can be obtained from the one or more training documents 502. Each of the plurality of textual training blocks 504A-504D can include one or more sentences from the one or more training documents 502. As an example, block 504A can include sentences S1-S3 from the training document(s) 502, block 504B can include sentences S4-S6 from the training document(s) 502, block 504C can include sentences S7-S9 from the training document(s) 502, and block 504D can include sentences S10-S12 from the training document(s) 502.

After obtaining the plurality of textual training blocks 504A-504D, the plurality of textual training blocks 504A-504D can be processed with a block encoding portion of an encoding submodel 506 (e.g., the first encoding submodel, the second encoding submodel, etc.) of the machine-learned semantic document encoding model to obtain a respective plurality of textual block representations 508A-508D. Each of the plurality of textual block representations 508A-508D can include the sentences of the textual blocks 504A-504D. For example, textual block representation 508A of textual block 504A can include sentences S1, S2, and S3 (e.g., or an encoded representation of the sentences, etc.).

Sentence(s) of one or more of the textual block representations 504A-504D can be masked during sentence level masking 510 to obtain a masked block representation (e.g., masked block representation 512. For example, it can be determined that only textual block representation 508A of the plurality of block representations 508A-508D will be masked during sentence-level masking 510. A mask can be applied to sentence S1 of textual block representation 508A (e.g., replacing the word with a masking token, etc.) during sentence-level masking 510 to obtain a masked block representation 512 of the textual block representation 508A.

The masked sentence S1 of the masked block representation 512 can be added to a corpus of candidate sentences 514. The corpus of candidate sentences can include a plurality of masked sentences from the one or more training documents 502. As an example, sentences from each of the one or more training documents 502 can be masked over a number of training iterations (e.g., S17, S85, S27, S14, S92, etc.). The corpus of candidate sentences 514 can include every masked sentence from each of the one or more training documents 502 (e.g., S17, S85, S27, S14, S92, etc.), and can also include the masked sentence of the masked block representation 512 (e.g., S1). In such fashion, the corpus of candidate sentences 514 can facilitate classification of the masked sentences as a multi-class classification problem.

The masked block representation 512 and the plurality of textual block representations 508B-508D can be processed with a document encoding portion of an encoding submodel 516 (e.g., a first encoding submodel, second encoding submodel, etc.) of a machine-learned semantic document encoding model to obtain a respective plurality of contextual block representations 520B-520D. Additionally, the output associated with processing the masked block representation 512 can be or otherwise include a multi-class classification output 518 that includes a predicted similarity between the masked sentence of the masked training block 512 and each of the masked sentences of the corpus of candidate sentences 514. As an example, the multi-class classification 518 can describe a predicted classification of the masked sentence of masked block representation 512 as each of the sentences included in the corpus of candidate sentences 514. A difference between the multi-class classification 518 and a ground truth label associated with the corpus of candidate sentences 514 can be evaluated by loss function 522. Based on the loss function, parameter adjustment(s) 524 can be determined and applied to the machine-learned semantic document encoding model (e.g., block encoding portion 506, document encoding portion 516, etc.).

Example Methods

Figure 6:
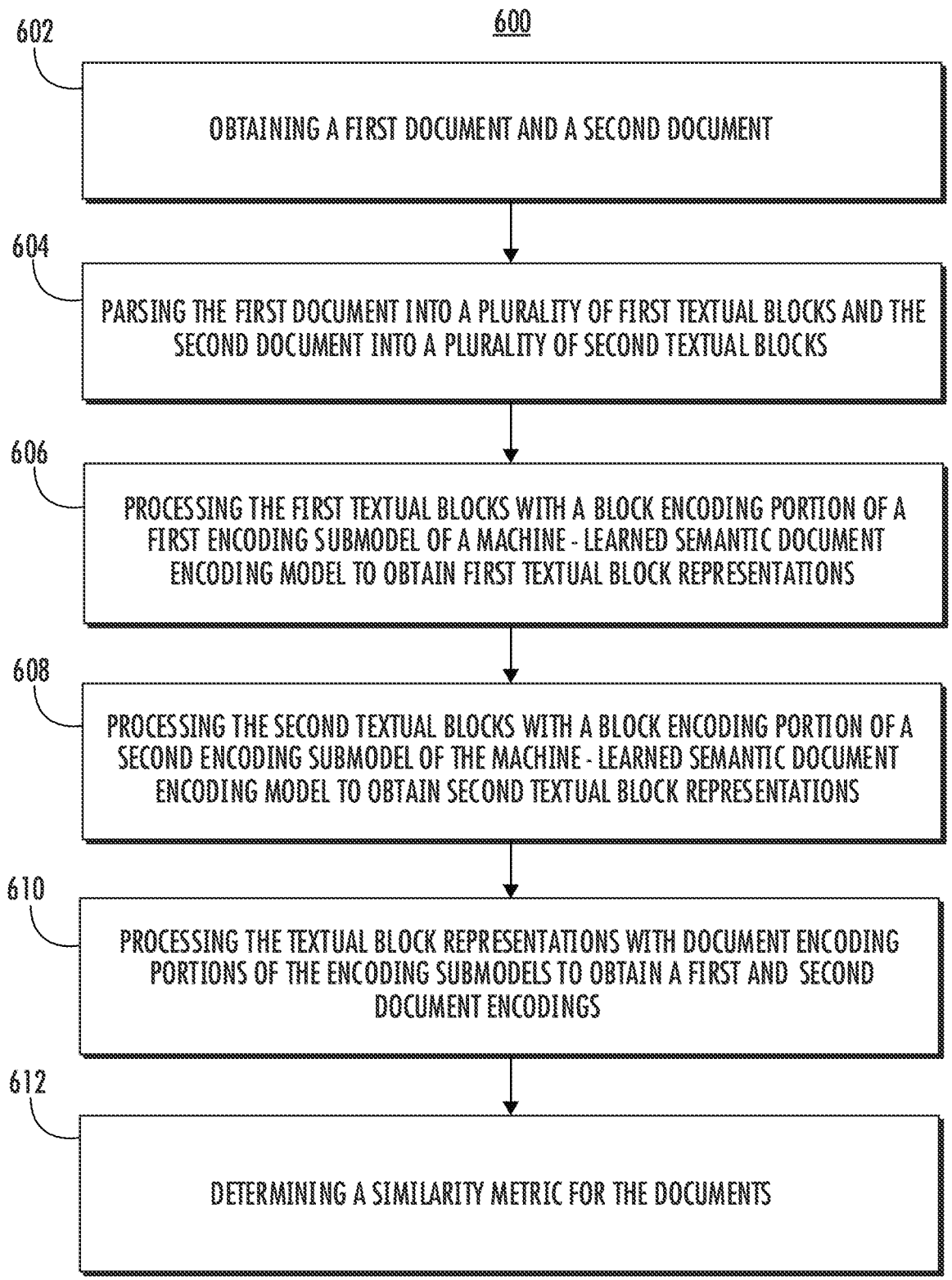
FIG. 6 depicts a flow chart diagram of an example method to perform prediction of semantic similarity between documents according to example embodiments of the present disclosure.

FIG. 6 depicts a flow chart diagram of an example method 600 to perform prediction of semantic similarity between documents according to example embodiments of the present disclosure. Although FIG. 6 depicts steps performed in a particular order for purposes of illustration and discussion, the methods of the present disclosure are not limited to the particularly illustrated order or arrangement. The various steps of the method 600 can be omitted, rearranged, combined, and/or adapted in various ways without deviating from the scope of the present disclosure.

At 602, a computing system can obtain a first document and a second document. More particularly, the computing system can obtain a first document comprising a plurality of first sentences and a second document comprising a plurality of second sentences.

At 604, the computing system can parse the first document into a plurality of first textual blocks and the second document into a plurality of second textual blocks. More particularly, the computing system can parse the first document into a plurality of first textual blocks and the second document into a plurality of second textual blocks, wherein each of the plurality of first textual blocks comprises one or more of the plurality of first sentences and each of the plurality of second textual blocks comprises one or more of the plurality of second sentences.

At 606, the computing system can process the first textual blocks with a block encoding portion of a first encoding submodel of a machine-learned semantic document encoding model to obtain first textual block representations. More particularly, the computing system can process each of the plurality of first textual blocks with a block encoding portion of a first encoding submodel of a machine-learned semantic document encoding model to obtain a respective plurality of first textual block representations.

At 608, the computing system can process the second textual blocks with a block encoding portion of a second encoding submodel of the machine-learned semantic document encoding model to obtain second textual block representations. More particularly, the computing system can process each of the plurality of second textual blocks with a block encoding portion of a second encoding submodel of the machine-learned semantic document encoding model to obtain a respective plurality of second textual block representations.

At 610, the computing system can process the textual block representations with document encoding portions of the encoding submodels to obtain a first and second document encodings. More particularly, the computing system can respectively process, by the computing system, the plurality of first textual block representations and the plurality of second textual block representations with a document encoding portion of the first encoding submodel and a document encoding portion of the second encoding submodel to obtain a first document encoding and a second document encoding.

At 612, the computing system can determine a similarity metric for the documents. More particularly, the computing system can determine a similarity metric descriptive of a semantic similarity between the first document and the second document based on the first document encoding and the second document encoding.

Additional Disclosure

The technology discussed herein makes reference to servers, databases, software applications, and other computer-based systems, as well as actions taken and information sent to and from such systems. The inherent flexibility of computer-based systems allows for a great variety of possible configurations, combinations, and divisions of tasks and functionality between and among components. For instance, processes discussed herein can be implemented using a single device or component or multiple devices or components working in combination. Databases and applications can be implemented on a single system or distributed across multiple systems. Distributed components can operate sequentially or in parallel.

While the present subject matter has been described in detail with respect to various specific example embodiments thereof, each example is provided by way of explanation, not limitation of the disclosure. Those skilled in the art, upon attaining an understanding of the foregoing, can readily produce alterations to, variations of, and equivalents to such embodiments. Accordingly, the subject disclosure does not preclude inclusion of such modifications, variations and/or additions to the present subject matter as would be readily apparent to one of ordinary skill in the art. For instance, features illustrated or described as part of one embodiment can be used with another embodiment to yield a still further embodiment. Thus, it is intended that the present disclosure cover such alterations, variations, and equivalents.

What is claimed is:

1. A computer-implemented method, comprising:
    obtaining, by a computing system comprising one or more computing devices, a plurality of textual training blocks from one or more training documents, wherein each of the plurality of textual training blocks comprises one or more sentences from one or more training documents;
    masking, by the computing system, one or more sentences of a textual training block of the plurality of textual training blocks to obtain a masked training block;
    processing, by the computing system, the plurality of textual training blocks with a machine-learned semantic document encoding transformer model to obtain a respective plurality of contextual block representations, wherein the contextual block representation for the masked training block comprises a multi-class classification output comprising a predicted similarity between the masked training block and each of a plurality of additional masked training blocks;
    evaluating, by the computing system, a pre-training loss function that evaluates a difference between the multi-class classification output and ground truth data associated with the masked training block and the plurality of additional masked training blocks; and
    adjusting, by the computing system, one or more parameters of the machine-learned semantic document encoding transformer model based at least in part on the pre-training loss function.

2. The computer-implemented method of claim 1, wherein the method further comprises:
    obtaining, by the computing system, a plurality of first textual block representations and a plurality of second textual block representations, wherein the plurality of first textual block representations represent a respective plurality of first textual blocks each comprising text from a first document, and wherein the plurality of second textual block representations represent a respective plurality of second textual blocks each comprising text from a second document;
    processing, by the computing system, the plurality of first textual block representations with a document encoding portion of a first encoding submodel of the machine-learned semantic document encoding transformer model to obtain a first document encoding;
    processing, by the computing system, the plurality of second textual block representations with a document encoding portion of a second encoding submodel of the machine-learned semantic document encoding transformer model to obtain a second document encoding; and determining, by the computing system, a similarity metric descriptive of a semantic similarity between the first document and the second document based on the first document encoding and the second document encoding.

3. The computer-implemented method of claim 2, wherein the method further comprises:

evaluating, by the computing system, a loss function that evaluates a difference between the similarity metric and ground truth data associated with the first document and the second document; and adjusting, by the computing system, one or more parameters of the machine-learned semantic document encoding transformer model based at least in part on the loss function.

4. The computer-implemented method of claim 2, wherein obtaining the plurality of first textual block representations and the plurality of second textual block representations comprises:

obtaining, by the computing system, the plurality of first textual blocks and the plurality of second textual blocks, wherein each of the plurality of first textual blocks comprises one or more first sentences of a plurality of first sentences of the first document, and wherein each of the plurality of second textual blocks comprises one or more second sentences of a plurality of second sentences of the second document;

processing, by the computing system, each of the plurality of first textual blocks with a block encoding portion of the first encoding submodel of the machine-learned semantic document encoding transformer model to obtain the plurality of first textual block representations; and processing, by the computing system, each of the plurality of second textual blocks with a block encoding portion of the second encoding submodel of the machine-learned semantic document encoding transformer model to obtain the plurality of second textual block representations.

5. The computer-implemented method of claim 4, wherein obtaining the plurality of first textual blocks and the plurality of second textual blocks comprises:

obtaining, by the computing system, the first document comprising the plurality of first sentences and the second document comprising the plurality of second sentences;

parsing, by the computing system, the first document into the plurality of first textual blocks and the second document into the plurality of second textual blocks, wherein each of the plurality of first textual blocks comprises one or more of the plurality of first sentences and each of the plurality of second textual blocks comprises one or more of the plurality of second sentences, wherein each of the plurality of first textual blocks comprises a textual capacity, and wherein parsing the first document into the plurality of first textual blocks comprises:

determining, by the computing system, that a first sentence parsed from the plurality of first sentences to a first textual block of the plurality of first textual blocks would exceed the textual capacity of the first textual block; and parsing, by the computing system, the first sentence to a subsequent first textual block of the plurality of first textual blocks.

6. The computer-implemented method of claim 2, wherein the machine-learned semantic document encoding transformer model comprises a machine-learned siamese transformer neural network, and wherein the first encoder submodel and the second encoder submodel respectively comprise a first machine-learned transformer neural network and a second machine-learned transformer neural network of the machine-learned siamese transformer neural network.

7. The computer-implemented method of claim 2, wherein the similarity metric comprises:

a binary prediction whether the first document and the second document are semantically similar; or a predicted level of semantic similarity between the first document and the second document.

8. The computer-implemented method of claim 2, wherein the method further comprises indexing, by the computing system for a search system, the first document encoding as a representation of the first document.

9. The computer-implemented method of claim 1, wherein masking the one or more sentences of the masked training block comprises masking at least one word of each of the one or more sentences.

10. A computing system, comprising:

one or more processors; and one or more tangible, non-transitory computer readable media storing computer-readable instructions that when executed by the one or more processors cause the one or more processors to perform operations, the operations comprising:

processing a plurality of textual training blocks with a machine-learned semantic document encoding transformer model to obtain a respective plurality of contextual block representations, wherein the plurality of textual training blocks comprises a masked training block, and wherein the contextual block representation for the masked training block comprises a multi-class classification output comprising a predicted similarity between the masked training block and each of a plurality of additional masked training blocks;

training the machine-learned semantic document encoding transformer model based on a pre-training loss function that evaluates a difference between the multi-class classification output and ground truth data associated with the masked training block and the plurality of additional masked training blocks;

processing information indicative of a plurality of portions of a first document with a document encoding portion of a first encoding submodel of the machine-learned semantic document encoding transformer model to obtain a first document encoding;

processing information indicative of a plurality of portions of a second document with a document encoding portion of a second encoding submodel of the machine-learned semantic document encoding transformer model to obtain a second document encoding; and determining, by the computing system, a similarity metric descriptive of a semantic similarity between the first document and the second document based on the first document encoding and the second document encoding.

11. The computing system of claim 10, wherein the operations further comprise:

training the machine-learned semantic document encoding transformer model based on a loss function that evaluates a difference between the similarity metric and ground truth data associated with the first document and the second document.

12. The computing system of claim 10, wherein the operations further comprise:
   indexing, for a search system, the first document encoding as a representation of the first document.

13. The computing system of claim 10, wherein processing the information indicative of the plurality of portions of the first document with the document encoding portion of the first encoding submodel of the machine-learned semantic document encoding transformer model to obtain the first document encoding comprises:
   obtaining a plurality of first textual block representations that represent a respective plurality of first textual blocks each comprising one or more first sentences from the first document; and
   processing the plurality of first textual block representations with the document encoding portion of the first encoding submodel of the machine-learned semantic document encoding transformer model to obtain the first document encoding.

14. The computing system of claim 13, wherein processing the plurality of first textual block representations with the document encoding portion of the first encoding submodel of the machine-learned semantic document encoding transformer model to obtain the first document encoding comprises:
   processing each of the plurality of first textual block representations with the document encoding portion of the first encoding submodel to obtain a respective plurality of first contextual block representations; and
   determining the first document encoding based at least in part on the plurality of first contextual block representations.

15. The computing system of claim 13, wherein obtaining the plurality of first textual block representations that represent the respective plurality of first textual blocks each comprising then one or more sentences from the first document comprises:
   obtaining the plurality of first textual blocks, wherein each of the plurality of first textual blocks comprises the one or more first sentences of a plurality of first sentences of the first document; and
   processing each of the plurality of first textual blocks with a block encoding portion of the first encoding submodel of the machine-learned semantic document encoding transformer model to obtain the plurality of first textual block representations.

16. The computing system of claim 15, wherein obtaining the plurality of first textual blocks comprises:
   obtaining the first document comprising the plurality of first sentences;
   parsing the first document into the plurality of first textual blocks, wherein each of the plurality of first textual blocks comprises the one or more first sentences of the plurality of first sentences of the first document, wherein each of the plurality of first textual blocks comprises a textual capacity, and wherein parsing the first document into the plurality of first textual blocks comprises:
      determining that a first sentence parsed from the plurality of first sentences to a first textual block of the plurality of first textual blocks would exceed the textual capacity of the first textual block; and
      parsing the first sentence to a subsequent first textual block of the plurality of first textual blocks.

17. One or more tangible, non-transitory computer readable media storing computer-readable instructions that when executed by one or more processors cause the one or more processors to perform operations, the operations comprising:
   obtaining a plurality of textual training blocks from one or more training documents, wherein each of the plurality of textual training blocks comprises one or more sentences from one or more training documents;
   masking one or more sentences of a textual training block of the plurality of textual training blocks to obtain a masked training block;
   processing the plurality of textual training blocks with a machine-learned semantic document encoding transformer model to obtain a respective plurality of contextual block representations, wherein the contextual block representation for the masked training block comprises a multi-class classification output comprising a predicted similarity between the masked training block and each of a plurality of additional masked training blocks;
   evaluating a pre-training loss function that evaluates a difference between the multi-class classification output and ground truth data associated with the masked training block and the plurality of additional masked training blocks; and
   adjusting one or more parameters of the machine-learned semantic document encoding transformer model based at least in part on the pre-training loss function.

18. The one or more tangible, non-transitory computer readable media of claim 17, wherein the operations further comprise:
   obtaining a plurality of first textual block representations and a plurality of second textual block representations, wherein the plurality of first textual block representations represent a respective plurality of first textual blocks each comprising text from a first document, and wherein the plurality of second textual block representations represent a respective plurality of second textual blocks each comprising text from a second document;
   processing the plurality of first textual block representations with a document encoding portion of a first encoding submodel of the machine-learned semantic document encoding transformer model to obtain a first document encoding;
   processing the plurality of second textual block representations with a document encoding portion of a second encoding submodel of the machine-learned semantic document encoding transformer model to obtain a second document encoding; and
   determining a similarity metric descriptive of a semantic similarity between the first document and the second document based on the first document encoding and the second document encoding.

19. The one or more tangible, non-transitory computer readable media of claim 18, wherein the operations further comprise:
   evaluating a loss function that evaluates a difference between the similarity metric and ground truth data associated with the first document and the second document; and
   adjusting one or more parameters of the machine-learned semantic document encoding transformer model based at least in part on the loss function.

20. The one or more tangible, non-transitory computer readable media of claim 18, wherein obtaining the plurality of first textual block representations and the plurality of second textual block representations comprises:
- obtaining the plurality of first textual blocks and the plurality of second textual blocks, wherein each of the plurality of first textual blocks comprises one or more first sentences of a plurality of first sentences of the first document, and wherein each of the plurality of second textual blocks comprises one or more second sentences of a plurality of second sentences of the second document;
- processing each of the plurality of first textual blocks with a block encoding portion of the first encoding submodel of the machine-learned semantic document encoding transformer model to obtain the plurality of first textual block representations; and
- processing each of the plurality of second textual blocks with a block encoding portion of the second encoding submodel of the machine-learned semantic document encoding transformer model to obtain the plurality of second textual block representations.

\* \* \* \* \*